US012427006B2

(12) United States Patent
Bhat et al.

(10) Patent No.: US 12,427,006 B2
(45) Date of Patent: Sep. 30, 2025

(54) MOUTHPIECE FOR A DENTAL CLEANING SYSTEM AND THE DENTAL CLEANING SYSTEM

(71) Applicant: KONINKLIJKE PHILIPS N.V., Eindhoven (NL)

(72) Inventors: Ravindra Bhat, Eindhoven (NL); Mart Kornelis-Jan Te Velde, Helmond (NL); Lutz Christian Gerhardt, Eindhoven (NL); Mark Thomas Johnson, Arendonk (BE); Edward Theodorus Maria Berben, Herten (NL); Bart Gottenbos, Budel (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 423 days.

(21) Appl. No.: 17/918,683

(22) PCT Filed: Apr. 7, 2021

(86) PCT No.: PCT/EP2021/058981
§ 371 (c)(1),
(2) Date: Oct. 13, 2022

(87) PCT Pub. No.: WO2021/209288
PCT Pub. Date: Oct. 21, 2021

(65) Prior Publication Data
US 2023/0145447 A1 May 11, 2023

(30) Foreign Application Priority Data
Apr. 15, 2020 (EP) .................................... 20169724

(51) Int. Cl.
*A61C 17/22* (2006.01)
*A61C 17/34* (2006.01)

(52) U.S. Cl.
CPC ........ *A61C 17/228* (2013.01); *A61C 17/3445* (2013.01); *A61C 17/3454* (2013.01)

(58) Field of Classification Search
CPC .............. A61C 17/228; A61C 17/3445; A61C 17/3454
See application file for complete search history.

(56) References Cited

U.S. PATENT DOCUMENTS

| | | | | |
|---|---|---|---|---|
| 8,448,282 B2 * | 5/2013 | Stapelbroek | ......... | A63B 71/085 433/41 |
| 8,636,677 B2 * | 1/2014 | Van Der Rijt | ....... | A61C 17/349 601/84 |

(Continued)

FOREIGN PATENT DOCUMENTS

| | | | | |
|---|---|---|---|---|
| EP | 2545883 A2 * | 1/2013 | ............. | A46B 9/045 |
| EP | 4282378 A1 * | 11/2023 | ........... | A61C 17/222 |

(Continued)

OTHER PUBLICATIONS

International Search Report and Written Opinion Dated Jul. 5, 2021 For International Application No. PCT/EP2021/058981 Filed Apr. 7, 2021.

*Primary Examiner* — Marc Carlson (57) ABSTRACT

The invention provides a mouthpiece for dental cleaning system and the dental cleaning system itself. The mouthpiece has a base and inner and outer arches. An actuator is for applying motion to the inner arch and/or the outer arch, relative to the base. A coupling arrangement converts motion of one of the inner and outer arches in one direction relative to the base to motion in an opposite direction relative to the base of the other of the inner and outer arches. By forming the mouthpiece as a central stationary base enveloped by two contour-following and moving arches, an anti-phase brushing motion at opposite tooth sites along the tooth arch (Continued)

is enabled, giving increased reach toward the molars as well as a reduction in device vibration in the mouth.

20 Claims, 9 Drawing Sheets

(56) References Cited

U.S. PATENT DOCUMENTS

| | | | |
|---|---|---|---|
| 11,278,385 B2 * | 3/2022 | Peled | A46B 9/045 |
| 2009/0276972 A1 * | 11/2009 | Dugan | A61C 17/349 |
| | | | 15/167.2 |
| 2013/0014331 A1 * | 1/2013 | Garner | A61C 17/228 |
| | | | 15/22.1 |
| 2013/0014332 A1 * | 1/2013 | Garner | A61C 17/228 |
| | | | 15/22.1 |
| 2013/0089836 A1 * | 4/2013 | Stapelbroek | A61C 17/3481 |
| | | | 433/216 |
| 2018/0184857 A1 * | 7/2018 | Pai | A46B 3/005 |

FOREIGN PATENT DOCUMENTS

| | | | | |
|---|---|---|---|---|
| JP | 9252843 A | 9/1997 | | |
| WO | WO-0247512 A1 * | 6/2002 | | A46B 9/045 |
| WO | WO-2008142600 A1 * | 11/2008 | | A61C 17/228 |
| WO | WO-2011161556 A1 * | 12/2011 | | A46B 13/02 |
| WO | WO-2019141393 A1 * | 7/2019 | | A46B 13/023 |

\* cited by examiner

MOUTHPIECE FOR A DENTAL CLEANING SYSTEM AND THE DENTAL CLEANING SYSTEM

This application is the U.S. National Phase application under 35 U.S.C. § 371 of International Application No. PCT/EP2021/058981, filed on Apr. 7, 2021, which claims the benefit of EP Application Serial No. 20169724.0, filed Apr. 15, 2020. These applications are hereby incorporated by reference herein.

FIELD OF THE INVENTION

This invention relates to dental cleaning systems, in particular to a dental cleaning system in the form of an automatic brush system based on an actuated mouthpiece.

BACKGROUND OF THE INVENTION

Automatic tooth brushing using cleaning mouthpieces has become an emerging technology. Several mouthpiece-based dental cleaning systems are in the development stage and claim in particular a short brushing time (e.g. 6-30 seconds). These systems hence have speed and ease of use as the main value drivers.

In this document, the term "mouthpiece" is used to refer to the part of a cleaning system which resides inside the mouth and is fitted to the teeth. Typically this is an arch to cover the teeth of a jaw or a pair of arches to cover the teeth of both jaws. The system will typically have other parts which remain external to the mouth, in use. Each arch of the mouthpiece for example has a base and side walls.

A dental cleaning system of this type for example comprises a mouthpiece which fits over the teeth of one or both jaws, with cleaning bristles facing the teeth. The mouthpiece or just the bristles are driven to move or vibrate relative to the teeth to provide a brushing action.

One issue that has been found is a lack of cleaning effectiveness, due to insufficient coverage/reach on the back molars and the gum line, lack of contour following of different jaw geometries, and due to limited kinetic energy transmitted to the teeth.

Difficulties are also found in providing sufficient energy transfer from an actuator to the bristles to enable sufficiently long bristle strokes and large amplitude needed to remove plaque. Vibrations/shaking of the jaw and head can also be a cause of discomfort.

By way of example, U.S. Pat. No. 8,636,677 discloses a dental cleaning system with an inner band along the inside surface of the teeth and an outer band along the outside surface of the teeth. The two bands and associated brush elements are moved towards and away from each other, vertically up/down or in small circular motions to clean the teeth.

There is a need for an improved dental cleaning system, for addressing some or all of the issues outlined above.

SUMMARY OF THE INVENTION

The invention is defined by the claims.

According to examples in accordance with an aspect of the invention, there is provided a mouthpiece for a dental cleaning system, comprising:
 a base;
 an inner arch for positioning adjacent an inner surface of the teeth of a jaw of the user; and
 an outer arch for positioning adjacent an outer surface of the teeth of the jaw,
 an actuator coupling for connection to an actuator for applying motion to the inner arch and/or the outer arch, relative to the base,
 wherein the base, the inner arch and the outer arch are coupled by a coupling arrangement, wherein the coupling arrangement converts motion of one of the inner and outer arches in one direction relative to the base to motion in an opposite direction relative to the base of the other of the inner and outer arches.

This mouthpiece has inner and outer arches for brushing mainly the inner and outer surfaces of the teeth (wherein the inner surfaces are those facing inwardly into the mouth cavity i.e. proximal to the mouth cavity and the outer surface are those facing outwardly from the mouth cavity i.e. distal from the mouth cavity). Tooth cleaning bristles are for example attached to the arches. Angled bristles may be used to reach the occlusal tooth surfaces. The base forms a central stationary part. It for example has a tooth-contacting part for the biting surfaces of the teeth, and a cleaning element may be added to brush the occlusal tooth surfaces. The base is connected to the two arches. A coupling arrangement, for example formed of hinges or pivots, provides an anti-phase coupling mechanism between the movement of the inner and outer arches. This anti-phase coupling mechanism assists in providing reach to the rear molars, and also provides cancellation of vibrations and hence reduces the shaking of the device inside the mouth or shaking of the user's head.

Note that the actuator coupling may be fixed (so the mouthpiece is not detachable from the associated actuator) or it may be a detachable coupling, e.g. to allow cleaning of the mouthpiece separated from the actuator.

The coupling arrangement in particular couples to adjacent regions of the inner and outer arches, and converts motion of said region of one of the inner and outer arches in one direction relative to the base to motion in an opposite direction relative to the base of said region of the other of the inner and outer arches.

The separation of the base from the arches means the user can bite down on the base without affecting the anti-phase motion and therefore brushing performance. Biting on the mouthpiece will not cause an increased load on the motor, for example by ensuring that the coupling arrangement is at a different level to the tooth-contacting part of the base. The arches, on which bristles are for example formed, are separated from the (?) base which defines the mouthpiece body.

The mouthpiece also enables desired brushing motion along the tooth arch to be implemented with sufficient transfer of energy to remove plaque, stains or softer calculus.

The coupling arrangement may comprise a symmetric or asymmetric arrangement of coupling members such as flexible hinges.

The coupling arrangement for example comprises coupling members extending between the inner and outer arches, the coupling members connecting to the base at a location between the inner and outer arches. The coupling members for example function as hinges, with the pivot point of the hinges being defined where they connect to the base. The hinges thus rock about at least one pivot point in at least one dimension to provide the anti-phase relative movement between the inner and outer arches. Pivot points may be provided in different dimensions (axes) in space to provide more complex 2D or 3D motions such as circular motions, transverse motions (with tapping) or motions along more than just one axis.

The coupling arrangement is for example configured to provide actuation of the inner arch or the outer arch at a front of the mouthpiece:

along a single side-to-side axis; or within a two dimensional side-to-side and up-down plane.

The front of the mouthpiece is the region positioned at the front teeth.

The arches may be driven to have lateral translational motion only, or else more complex motions can be generated such as up-down motion combined with lateral strokes, for example forming circular rotational motions. A more complex motion may for example be created by combining a 1D motion such as tapping (i.e. in a direction across rather than along the tooth) with a sliding motion or 2D circular motion along the tooth, which enhances the cleaning result.

In a first set of examples, the coupling arrangement comprises:

a first hinge at the back of a first lateral side (i.e. a left side or a right side) of the mouthpiece, which first hinge connects a back portion of the inner arch, a back portion of the outer arch and the base at said first lateral side; and a second hinge at the back of a second lateral side of the mouthpiece, which second hinge connects a back portion of the inner arch, a back portion of the outer arch and the base at said second lateral side.

In this design, the coupling arrangement comprises hinges at the back of the arches, on both lateral sides (i.e. one at the left side and one at the right side of the mouthpiece).

In a second set of examples, the coupling arrangement comprises:

a first hinge along a first lateral side of the mouthpiece set forward from the back of the first lateral side, which first hinge connects the inner arch, the outer arch and the base at that first lateral side; and a second hinge along a second lateral side of the mouthpiece set forward from the back of the second lateral side, which second hinge connects the inner arch, the outer arch and the base at that second lateral side.

In this design, the coupling arrangement comprises hinges set forward from the back of the arches, again with one on each side.

The coupling arrangement may then further comprise a first connector between the inner and outer arches at the back of the first lateral side and a second connector between the inner and outer arches at the back of the second lateral side. These connectors maintain the desired spacing between the inner and outer arches as well as permitting the anti-phase motion, but the anti-phase motion is generated/induced by the first and second hinges.

The first and second hinges in these designs for example each comprise:

a strut, rigidly coupled to the inner and outer arch with a pivot point symmetrically or asymmetrically located along the strut which is coupled to the base; or a first U-bend or W-bend between the outer arch and at least one connecting node, and a second U-bend or W-bend between the connecting node and the inner arch, wherein the connecting node is coupled to the base.

Thus, different hinge designs are possible for generating the desired anti-phase coupling, with suitable elasticity.

The mouthpiece (base, coupling arrangement and arches) may be formed of a single material. However, in an example, the inner arch and outer arch are for example formed of a first material and the coupling arrangement, or portions of the coupling arrangement, are formed of a different material to the first material. The use of different materials enables the elastic coupling properties of the compliant system to be optimized.

The invention also provides a dental cleaning system comprising:

the mouthpiece as defined above; and an actuator coupled to the coupling of the mouthpiece.

The dental cleaning system for example comprises a frame which carries the actuator, wherein the frame is rigidly coupled to the base. Thus, the base and the frame are static parts of the system. The user can bite on the static base, and the motor is fixed on the frame, which is also fixed relative to the base. Thus, all movements are performed by the mouthpiece only, in particular the arches, which ensure that most of the vibration energy goes into the mouth for cleaning and minimizes losses of vibration energy in the handle.

The actuator is for example arranged in front of the mouthpiece (i.e. outside of, and in front of the mouth of the user) and couples to the outer arch at the front of the mouthpiece. The frame and actuator for example form a handle of the cleaning system.

The frame for example couples to the outer arch with a connection which allows rotation of the outer arch relative to the frame about a rotation axis behind the front of the mouthpiece. This rotation axis is for example a vertical axis, allowing side-to-side rotation. The frame thus has a rigid connection to the base and a flexible connection to the outer arch, so that the outer arch can move relative to the base.

In all examples, the actuator may comprise a motor with an eccentric coupling element which connects to the outer arch. The eccentric coupling convers a rotational motor output to the desired 1D, 2D or 3D motion pattern to be applied to one of the arches. An eccentric motor may for example be integrated in the handle of the cleaning system to actuate the outer arch with suitable frequencies in the range of 0.5-300 Hz and strokes of about 0.5-10 mm to obtain a large range of reach towards the back teeth.

In another set of examples, instead of forming the actuator outside of and in front of the mouthpiece, the actuator may be arranged in a space partially surrounded by the inner arch. Thus, it may be for positioning inside the user's mouth. This may enable a more compact device.

The coupling arrangement may then comprise first and second swash plates at the output of the actuator, wherein:

the first swash plate connects to a back of opposite lateral sides of the inner arch, and the second swash plate connects to a back of opposite lateral sides of the outer arch; or the first swash plate connects to a back of one same lateral side of the inner and outer arches, and the second swash plate connects to a back of the other same lateral side of the inner and outer arches.

These swash plate designs enables the desired anti-phase motion to be generated directly at the output of the actuator, e.g. motor In all examples, the dental cleaning system may further comprise cleaning elements (silicone bristles, nylon bristles, etc.) on the inner arch and the outer arch, as well as on the base to be able to brush the occlusal tooth surfaces.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a mouthpiece for a dental cleaning system and the dental cleaning system itself. The mouthpiece has a base and inner and outer arches. An actuator is used for applying motion (i.e. movement) to the inner arch and/or the outer arch, relative to the base. A coupling arrangement converts motion of one of the inner and outer arches in one direction relative to the base to motion in an opposite direction relative to the base of the other of the inner and outer arches. By forming the mouthpiece as a central stationary base enveloped by two contour-following and moving arches (coupled via the coupling arrangement), an anti-phase brushing motion at opposite tooth sites along the tooth arch is enabled, giving increased reach toward the molars as well as a reduction head shaking or device shaking inside the mouth.

Figure 1:
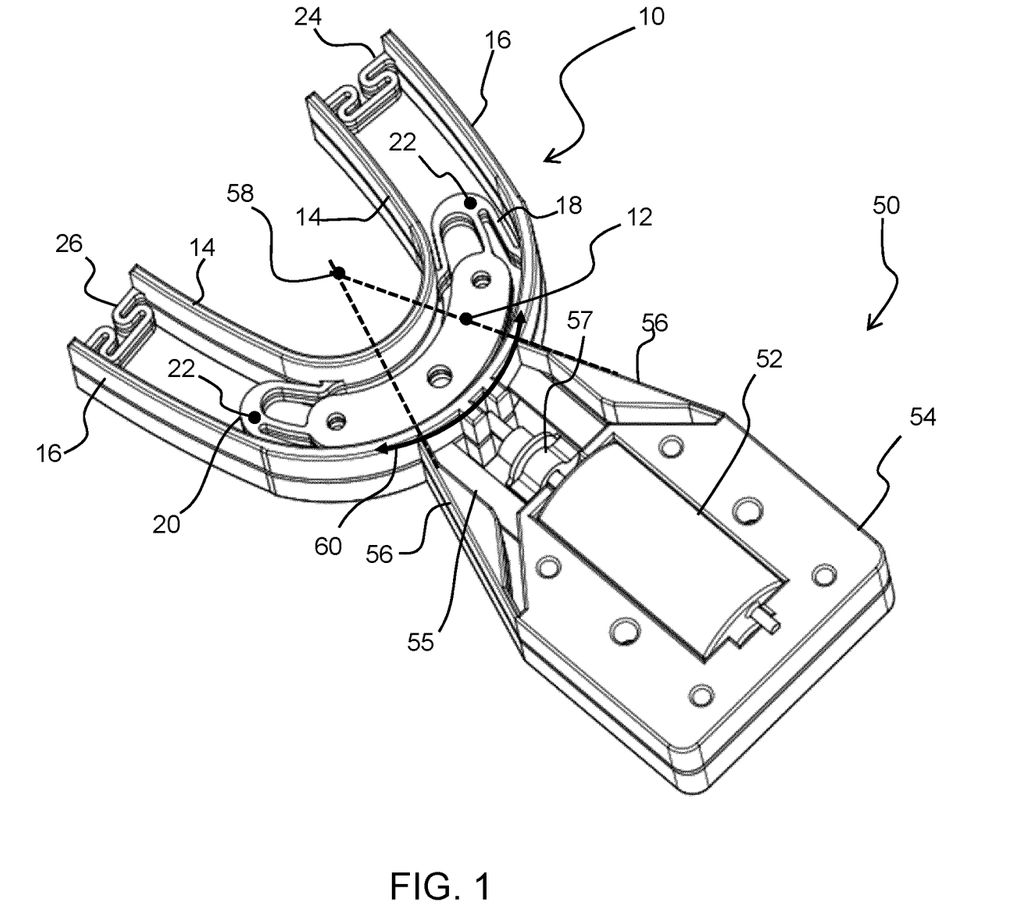
FIG. 1 shows a first example of a dental cleaning system.

FIG. 1 shows a first example of a dental cleaning system. The system comprises a mouthpiece 10 for insertion in the mouth of the user and an external part 50 for positioning outside the mouth of the user, in front of the user's mouth. The external part 50 for example functions as a handle of the system.

The mouthpiece comprises a first U-shaped channel for receiving the teeth of one jaw, and a second U-shaped channel for receiving the teeth of the other jaw. The mouthpiece is bitten onto by the user with their teeth in the two channels. The system may instead have only one channel, in which case the cleaning may be performed one jaw at a time.

In FIG. 1, the features of one of the U-shaped channels can be seen (facing upwardly). The opposite, downward facing, U-shaped channel may be the same. The features of one of the U-shaped channels will be described.

For the shown U-shaped channel, the mouthpiece 10 comprises a base 12, an inner arch 14 for positioning adjacent an inner surface of the teeth of a jaw of the user and an outer arch 16 for positioning adjacent an outer surface of the teeth of the jaw.

The U-shaped channel of the mouthpiece fits over the teeth of the jaw with the inner and outer arches 14, 16 positioned against the inner and outer surfaces of the teeth. The user can bite on the base 12 (or an insert with cleaning elements mounted on the base; not shown in FIG. 1) because it is intended to be static in use, whereas the inner and outer arches 14, 16 are designed to move against the surface of the teeth, in the manner explained further below.

It is noted that in FIG. 1 and several other figures, cleaning bristles are omitted for the sake of clarity, because the focus of the invention relates to motion generation and reach. Bristles or tufts may be provided at various angles, length, packing density etc. on various parts of the mouthpiece: the inner arch, the outer arch and the stationary base.

There may be bristles on the base for the biting surfaces of the teeth or bristles may reach across from the sides to contact the biting surfaces. It is preferred that a tooth-contacting part with cleaning elements (bristles) is added on top of the base to enable brushing the occlusal tooth surfaces.

The external part 50 has an actuator 52 for applying movement to the inner arch and/or the outer arch, relative to the base. For a system with two U-shaped channels, a shared actuator is used. In this example, the actuator 52 is in front of the mouthpiece and therefore connects most simply with the outer arch 16, as shown. It could however connect to the inner arch 14. Similarly, in other examples where the actuator is inside the user's mouth within the U-shaped space formed by the inner arch, it may most easily connect to the inner arch instead of the outer arch.

The base 12, the inner arch 14 and the outer arch 16 are coupled by a coupling arrangement 18, 20. The coupling arrangement 18, 20 converts movement of one of the inner and outer arches in one direction relative to the base to movement in an opposite direction relative to the base of the other of the inner and outer arches. In particular, each coupling arrangement connects between adjacent regions of the inner and outer arches. These regions are adjacent, in that they are located at the same angular position around the jaw. The coupling arrangement connects between those adjacent regions. The coupling arrangements for example perform a pivot function.

Thus, in the example shown in FIG. 1, the actuator 52 imparts movement to the outer arch 16, and the coupling arrangement 18, 20 converts this movement to an anti-phase movement (i.e. in an opposite direction) of the inner arch.

By "opposite direction" is not necessarily meant a perfectly opposite movement vector. Instead, one direction is generally across the edge surfaces of the teeth from one side of the jaw to the other (e.g. right to left), and the opposite direction is generally across the edge surfaces of the teeth from the other side of the jaw to the one side of the jaw (e.g. from left to right).

The coupling arrangement 18, 20 is not clamped when the user bites down, but is free to move. This may be enabled be providing the coupling arrangement at a different level to the tooth-contacting part of the base 12.

The cleaning system thus has inner and outer arches for brushing the inner and outer surfaces of the teeth. The base is a central stationary part. The anti-phase coupling assists in providing reach to the rear molars and also provides cancellation of vibrations and hence reduces the shaking of the device inside the mouth.

The separation of the base from the arches means the user can bite down on the base without affecting the brushing performance. Biting on the mouthpiece will not cause an increased load on the motor, and hence will not dampen the driven vibrations. The system enables the desired brushing motion along the tooth arch to be implemented with sufficient transfer of energy to remove plaque and stains.

The coupling arrangement comprises coupling members 18, 20 each extending between the inner and outer aches 14, 16. The coupling members 18, 20 each connect to the base 12 at a location 22 between the inner and outer arches, via a flexible strut or web. The coupling members 18, 20 and flexible struts function as hinges, with a main pivot point of the hinges being defined at some point on a flexible connecting member which extends between the base 12 and the location 22 where the coupling members connect to the base. The hinges thus rock about the pivot point to provide the anti-phase movement of the inner and outer arches. Some pivoting at the connections between the ends of the coupling members and the inner and outer arches allows the overall arrangement to have the required flexibility.

FIG. 1 shows that the actuator 52 is mounted in a frame 54. The frame 54 is rigidly coupled to the base 12 by a support plate 55 (shown more clearly in other figures) so that the base and the frame are static parts of the system.

The frame 54 also connects to the outer arch 16 by limbs 56. These limbs 56 provide a movable coupling between the main body of the frame and the outer arch 16. In particular, the limbs 56 allow rotation of the outer arch relative to the frame 54 about a rotation axis 58 behind the front of the mouthpiece. This movement is shown by arrow 60.

In the example of FIG. 1, the coupling arrangement comprises a first coupling member in the form of a hinge 18 along a first lateral side of the mouthpiece (the left side of the user's jaw) set forward from the back of the first lateral side. This first hinge 18 connects the inner arch, the outer arch and the base at that first lateral side. A second hinge 20 is along the other lateral side of the mouthpiece (the right side of the user's jaw) set forward from the back of the other lateral side. The second hinge 20 connects the inner arch, the outer arch and the base at that second lateral side. The coupling arrangement thus comprises hinges set forward from the back of the arches.

The coupling arrangement additionally has a first connector 24 between the inner and outer arches 14, 16 at the back of the first lateral side and a second connector 26 between the inner and outer arches at the back of the second lateral side. These connectors 24, 26 maintain the desired spacing between the inner and outer arches and allow a transfer of the anti-phase movement, but the anti-phase motion is initially generated by the first and second hinges 18, 20.

The actuator 52 in this example comprises a motor, with a rotating output shaft. An eccentric coupling 57 converts the rotation into a desired movement of the outer arch 16. This desired movement may be a simple lateral oscillation (i.e. left to right), or it may be a more complex motion, such as a motion in a 2D plane (i.e. left to right and up-down, i.e. in a vertical plane in a normal orientation of the device) such as a circular motion. It may even be a 3D motion, with a component in the 2D plane (the vertical plane) as well a component parallel to the output shaft axis. This may be used to provide an additional tapping effect.

Thus, in a most basic example, the actuator applies a lateral 1 dimensional translational motion, thus providing movement of the arch along a single side-to-side axis. More complex motions are however possible. A combination of a tapping motion (i.e. in a direction across rather than along the tooth) and a sliding motion may enhance the cleaning result.

An eccentric motor may for example be integrated in the handle of the mouthpiece to actuate the outer arch with suitable frequencies in the range of 0.5-300 Hz and strokes of about 0.5-10 mm to obtain a large range of reach towards the back teeth.

Figure 2:
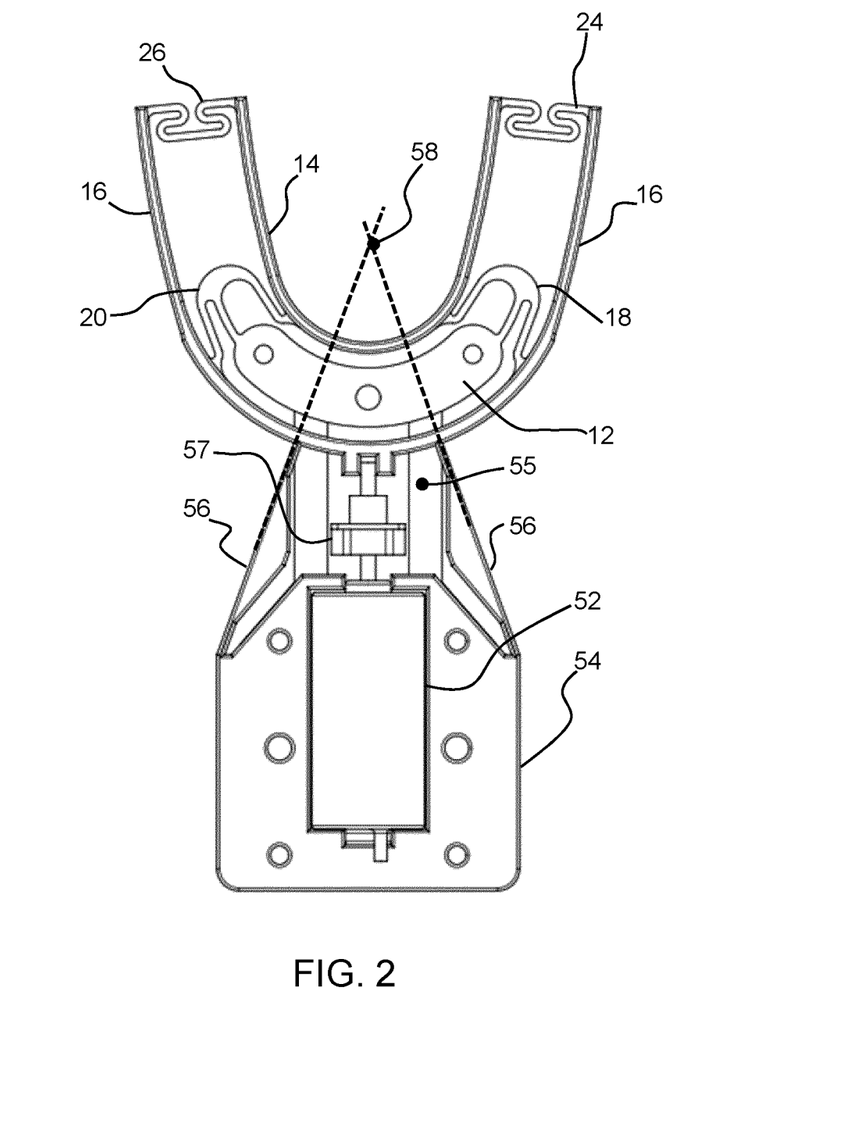
FIG. 2 shows the design of FIG. 1 from above.

FIG. 2 shows the design of FIG. 1 from above.

Figure 3:
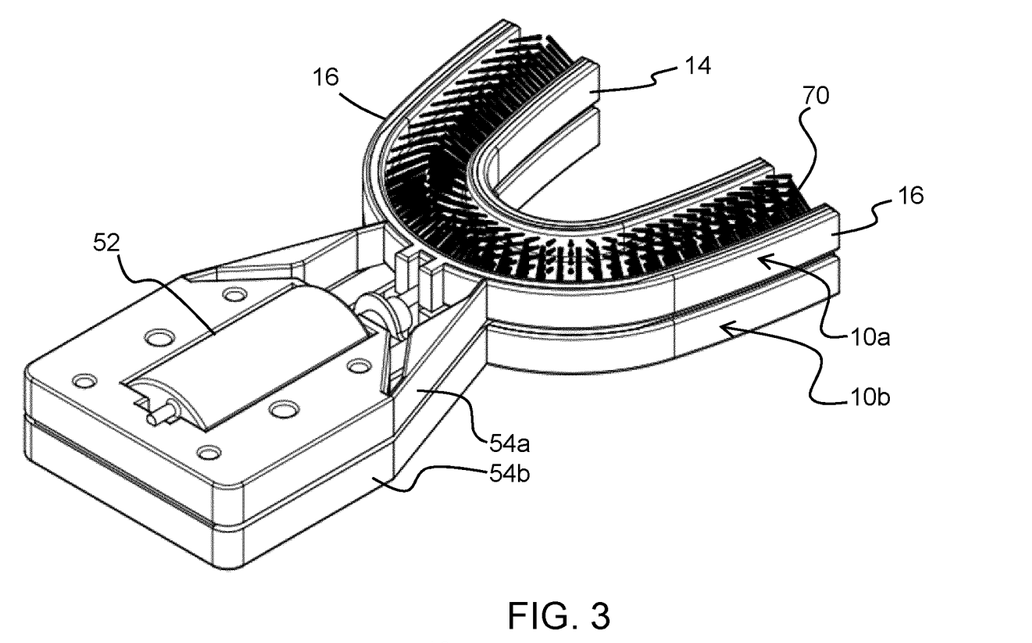
FIG. 3 shows more clearly that the design of FIG. 1 has two U-shaped channels back to back, to enable cleaning of the teeth of both jaws at the same time.

FIG. 3 shows more clearly that the design of FIG. 1 has two U-shaped channels 10a, 10b back to back, to enable cleaning of the teeth of both jaws at the same time. and with cleaning elements such as bristles 70 projecting inwardly (towards the teeth) from the inner and outer arches.

There is a single shared actuator 52, two back to back U-shaped channels 10a, 10b and two separate frames 54a, 54b.

Figure 4:
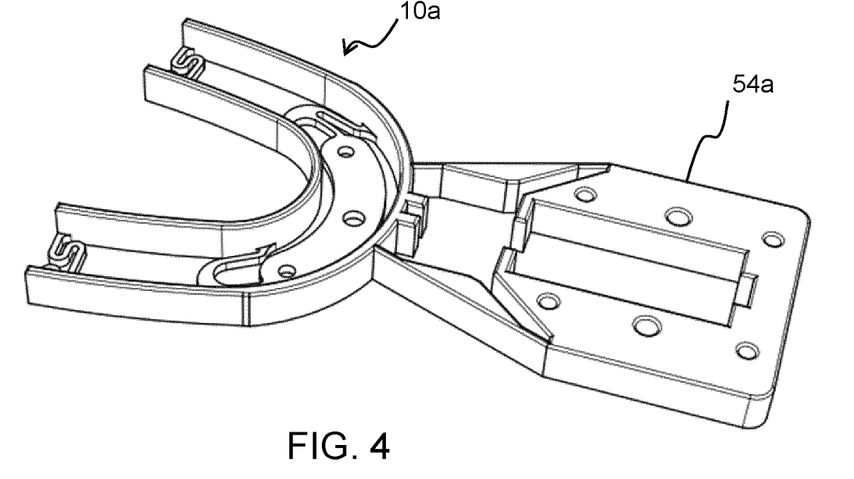
FIG. 4 shows one unit which is an assembly of one U-shaped channel of the mouthpiece and one frame.

FIG. 4 shows one unit which is an assembly of one U-shaped channel 10a of the mouthpiece 10 and one frame 54a (which connects to the outer arch) and excluding the support plate 55, which is a separate part.

Figure 5:
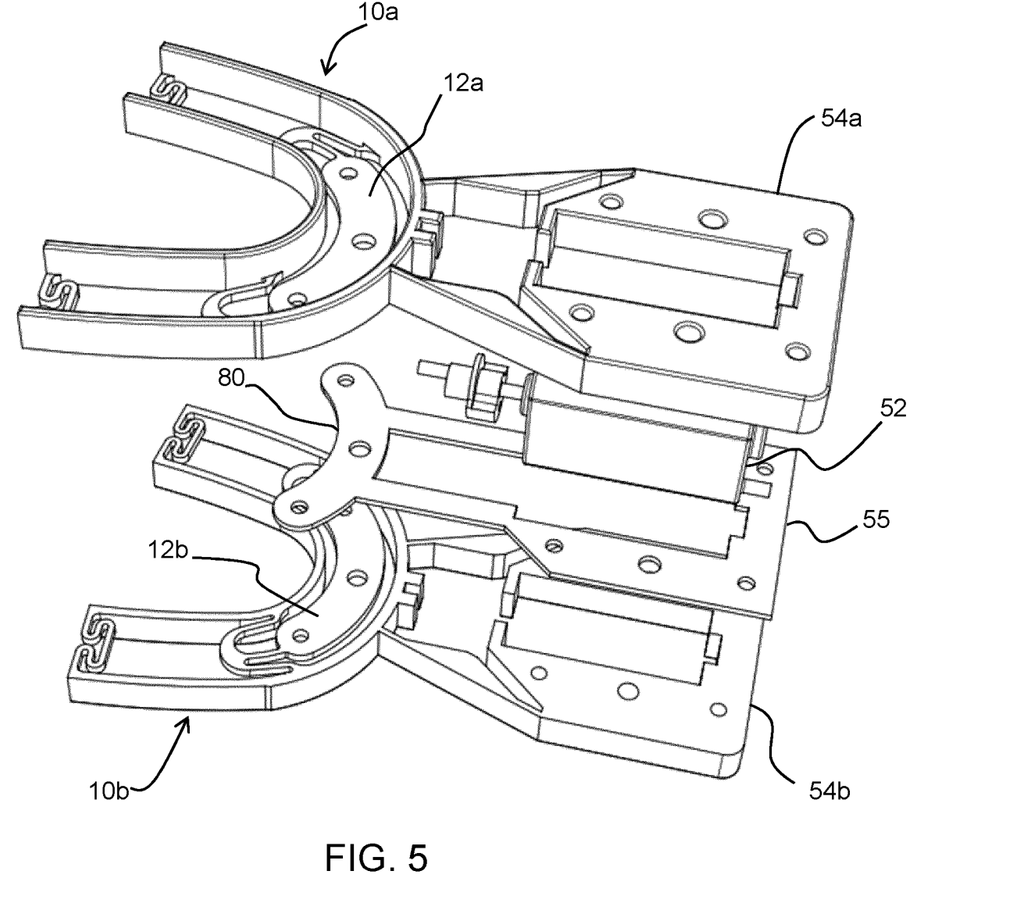
FIG. 5 shows an exploded view of the design of FIGS. 1 to 4.

FIG. 5 shows an exploded view of the design of FIGS. 1 to 4.

The support plate 55 carries the actuator 52, and it is sandwiched between the first and second frames 54a, 54b. The support plate has a mounting region 80 to which the bases 12a, 12b of the two U-shaped channels 10a, 10b of the mouthpiece 10 connect. The two bases and the mounting region are for example clamped together with bolts or screws.

Figure 6:
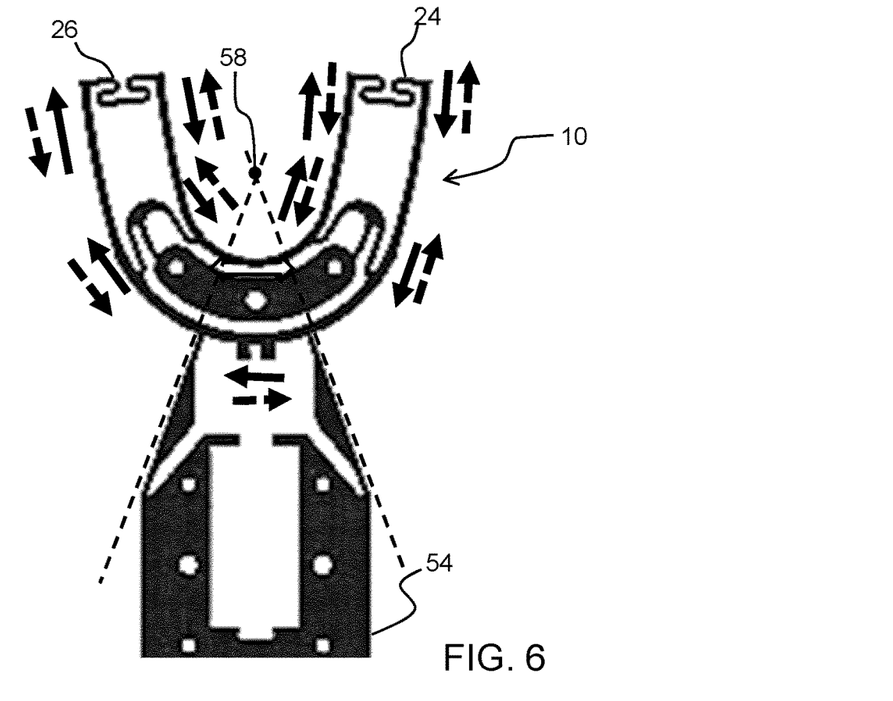
FIG. 6 shows the shape of the mouthpiece and the part of the frame which connects to the outer arch of the mouthpiece.
Figure 8:
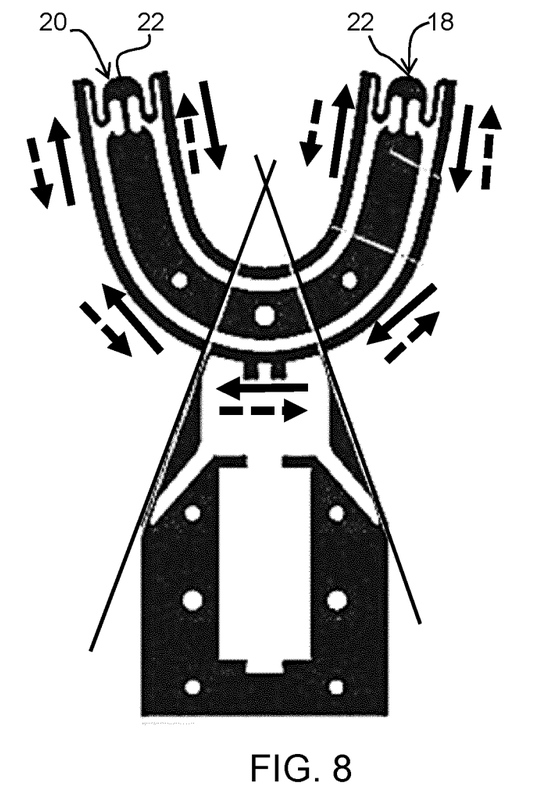
FIG. 8 shows the shape of the mouthpiece and the part of the frame which connects to the outer arch of the mouthpiece for an alternative design.

FIG. 6 shows the shape of the mouthpiece 10 and the part of the frame 54 which connects to the outer arch of the mouthpiece, and how the anti-phase motion is induced by pairs of arrows pointing in different directions along the arches. The motion of the solid arrows takes place at one time, and the motion of the dashed arrows takes place at a subsequent time. This is provided to enable comparison with an alternative example which is shown in FIG. 8.

Figure 7:
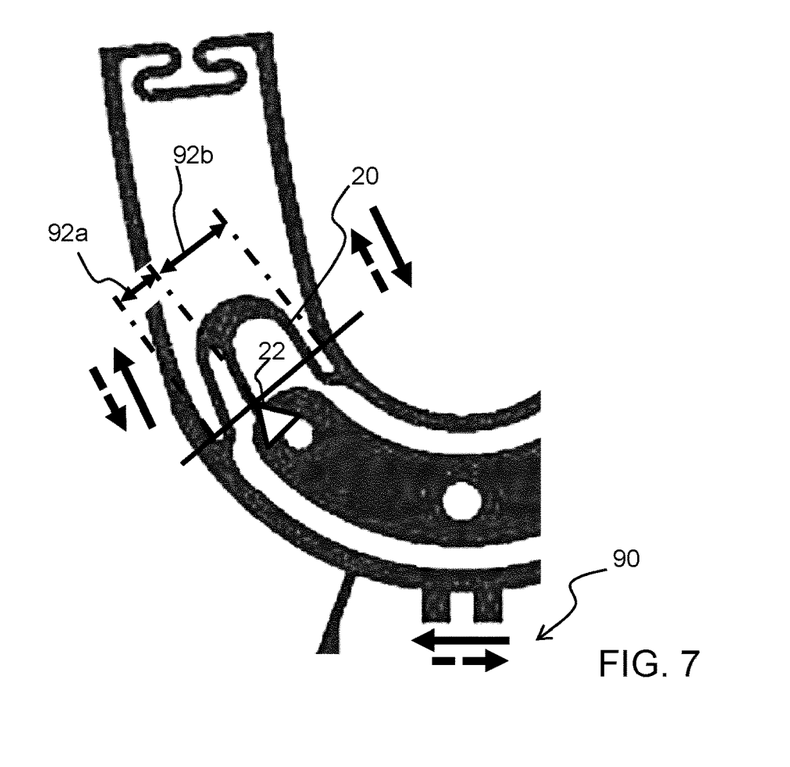
FIG. 7 shows how the anti-phase motion is induced using the design of the mouthpiece shown in FIG. 6.

FIG. 7 shows how the anti-phase motion is induced using the design of the mouthpiece shown in FIG. 6.

The actuator induces lateral movement as shown by the pair of arrows 90. The coupling member 20 has the main hinge pivot point defined at some point on the flexible connect between the base 12 and the location 22. The hinge point is in this example asymmetrically positioned between the inner and outer arches (although a symmetric arrangement is also possible, shown below). Thus, the movement of the outer arch is amplified (based on the ratio between the distances 92a, 92b). This compensates for a loss of motion causes by losses in the flexible hinge structure.

Thus, the asymmetrical hinge design provides improved transfer of motion between the outer arch and the inner arch.

As a general indication of the approximate range of movement which may be used, the anti-phase motion amplitude may be of the order of 1 mm to 5 mm. For example, the actuation amplitude may be around ±1.2 mm with an actuation input of ±1.5 mm. A larger actuation amplitude may be used, e.g. around 3-4 mm (half the width of a molar), for example using geared motors.

In the example of FIGS. 1 to 7, the hinges of the coupling arrangement are set forward from the back of the mouthpiece as explained above, and there are additional connectors 24, 26. An advantage of the example of FIGS. 1 to 7 is that the coupling members transfer motion from the outer arch to the inner arch close to the actuator. This minimizes motion loss and allows the molar section to conform to the teeth.

FIG. 8 shows an alternative design, in which the coupling arrangement comprises a first hinge 18 at the back of a first lateral side (the left side) of the mouthpiece. This first hinge 18 connects the back of the inner arch 14, the back of the outer arch 16 and the back of the base 12 at said first lateral side. A second hinge 20 is at the back of the opposite lateral side (the right side) of the mouthpiece. The second hinge connects the back of the inner arch 14, the back of the outer arch 16 and the back of the base 12 at that opposite lateral side. This structure has fewer intricate parts.

The hinges are shown as symmetrical in this example, with the main pivot point mid-way between the inner and outer arches. Thus, it can be seen that different hinge designs are possible with symmetric or asymmetric positioning of the main hinge.

The examples above make use of coupling members formed as a first U-shaped coupling between the outer arch and the location 22 (where there is a strut connecting to the base), and a second U-shaped coupling between the location 22 and the inner arch. An alternative design makes use of first and second W-shaped couplings.

Figure 9:
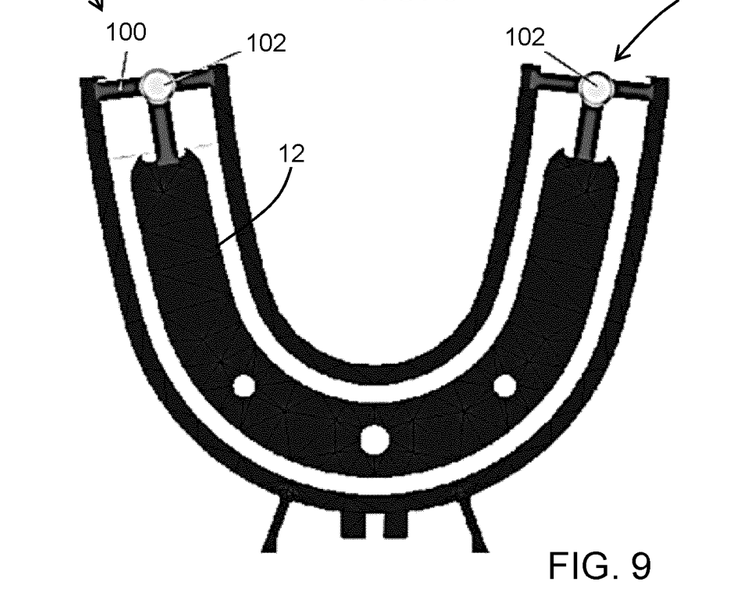
FIG. 9 shows a further alternative design of the coupling members.

FIG. 9 shows a further alternative design of the coupling members 18, 20. A rigid strut 100 extends between the inner and outer arches, and a pivot or rocker bearing 102 provides the connection to the base 12. There is thus a T-shaped connector with a pivot point at the interconnection of the three limbs of the strut.

The mouthpiece (base, coupling arrangement and arches) may be formed of a single material. However, in an example, the inner arch and outer arch are for example formed of a first material and the coupling arrangement, or portions of the coupling arrangement, are formed of a different material to the first material. The use of different materials enables the elastic coupling properties to be optimized.

Figure 10A:
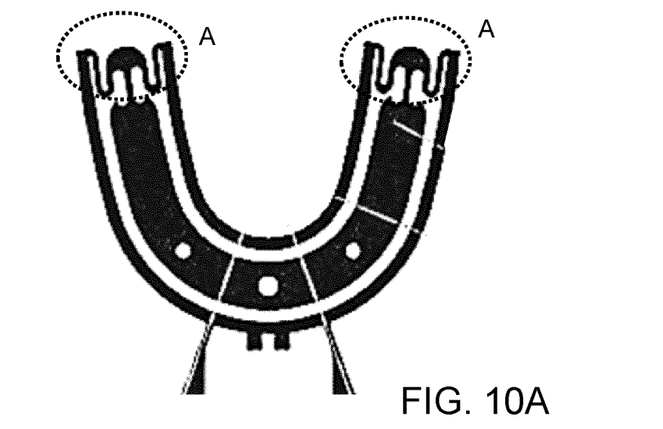
FIGS. 10A to 10C show how different materials may be used in the designs of FIGS. 6 and 8.

FIG. 10A shows the design of FIG. 8 and shows regions A which may be formed of a different material (material A) to the remainder of the structure.

Figure 10B:
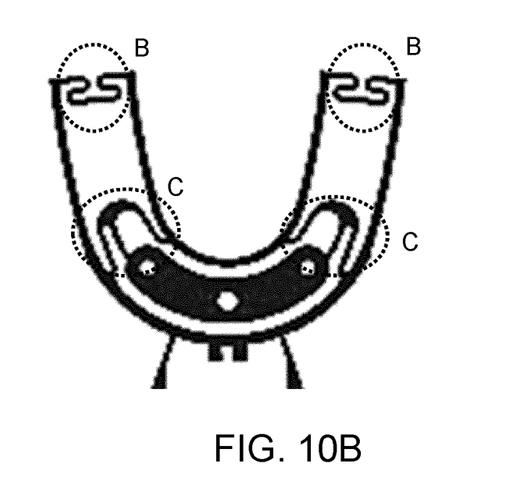

FIG. 10B shows the design of FIG. 6 and shows regions B and C which may be formed of a different material to the remainder of the structure. Regions B and C may be of the same material (material B), or they may be two different materials (materials B, C), both different to the main structure.

Figure 10C:
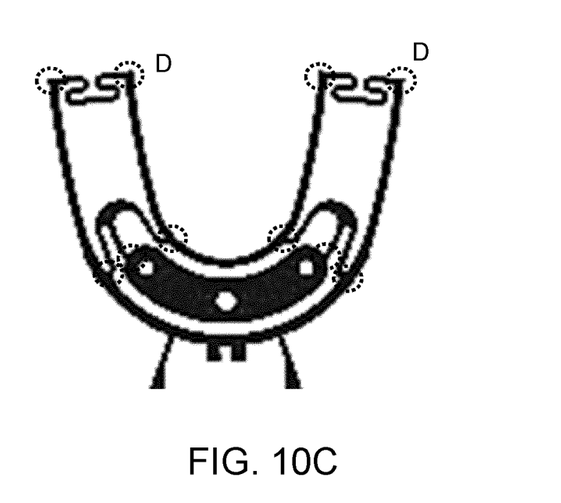

FIG. 10C shows the design of FIG. 6 and shows regions D which may be formed of a different material (material D) to the remainder of the structure. These regions formed of a different material are the joints between the coupling members and the arches and the joints between the coupling members and the base.

Materials A to D have for example a (relatively) low hardness and low Young's modulus to add flexibility and deformity to the hinges.

The material of the remainder of the structure has for example a (relatively) medium or high hardness and medium or high Young's modulus.

By way of example, the main material may be polyethylene (with elastic modulus 1.1 GPa and Poisson's ratio 0.42. While this is one option of food grade material for parts with flexure design (living hinges), there are also other materials such as polyamides (e.g. Nylon) and a thermoplastic elastomer that can be used for this application.

The hinges are designed for low stress, long life and minimal loss of energy in the system. The parts may be made by 3D printing or by injection molding, for example.

The overall system can be described as a compliant spring system. The system may for example be driven at its resonance frequency, reducing the power needs of the system. The frequency may also be tuned individually to the resonance frequency, using feedback of the amplitude, since damping on the teeth may vary from person to person, and also parts of the system may be customized for better fitting.

Figure 11:
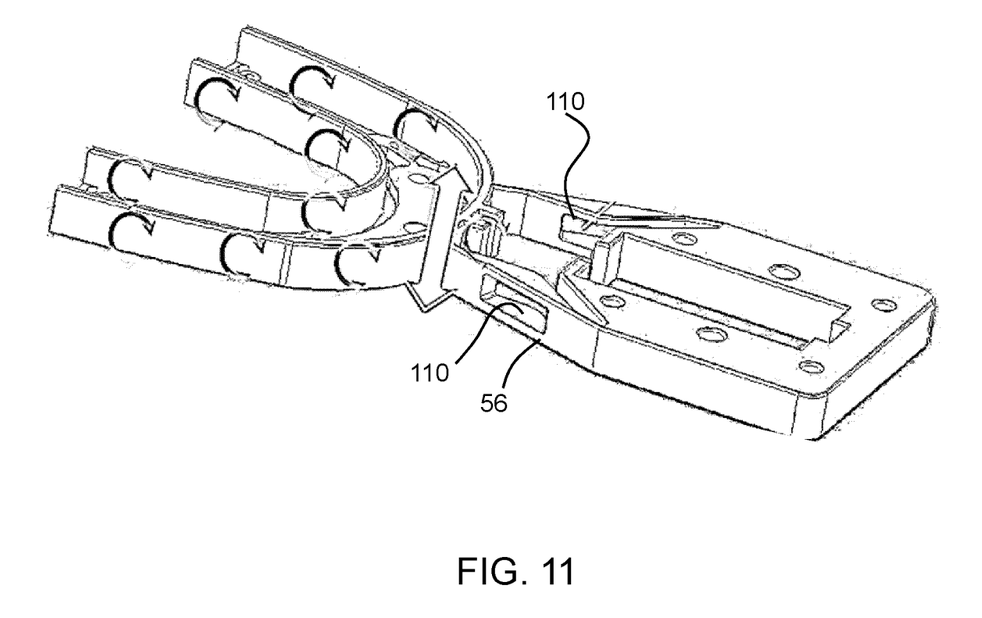
FIG. 11 shows a modification of the frame to create an additional degree of freedom.

As explained above, a 1-dimensional reciprocating brushing motion may be used. FIG. 11 shows a modification in which the limbs 56 are made thinner and have a cut-out 110 to create an additional degree of freedom in their movement. This can be used to generate a 3D motion from a 2D eccentric drive. For example, by actuating with a circular trajectory, a more complex (2D) circular brushing motion is generated. By adding another pivot point, a complex 3D motion can be generated, e.g. circular motion superimposed by a tapping motion.

In the example above, the actuator is in front of the mouthpiece, i.e. outside the mouth. In another set of examples, instead of forming the actuator outside of and in front of the mouthpiece, the actuator may be arranged in a space partially surrounded by the inner arch. Thus, it may be for positioning inside the user's mouth. This may enable a more compact device.

One option is to use a similar actuator to that shown above, for example for driving the inner arch (which is then closer to the actuator).

Figure 12:
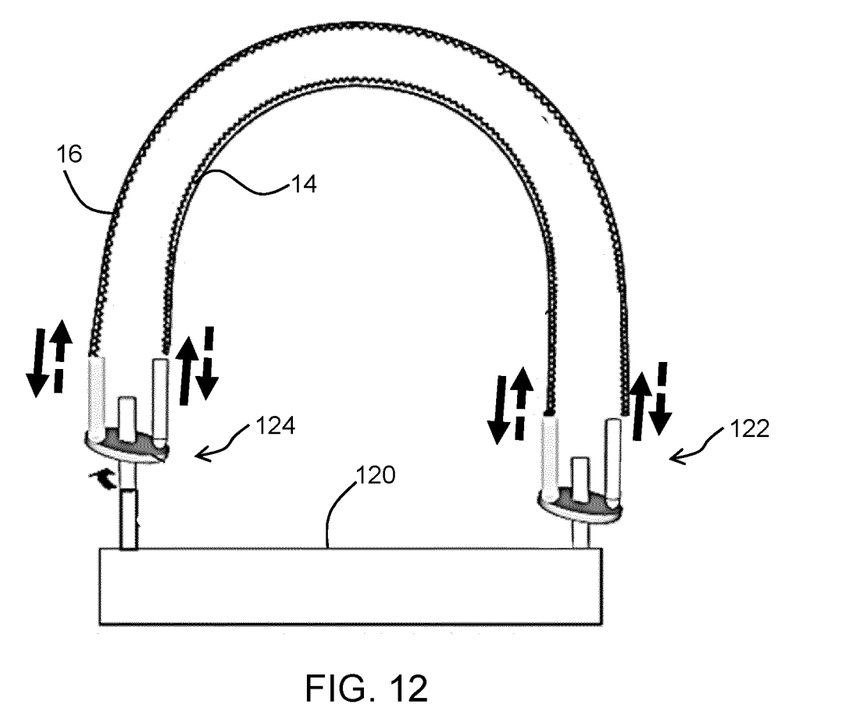
FIG. 12 shows a first alternative actuator design.

FIG. 12 instead shows an alternative actuator design.

The actuator comprises a dual shaft motor 120 with swash plates at the output shafts. A first swash plate 122 connects to a back of one same lateral side of the inner and outer arches 14, 16, and a second swash plate 124 connects to a back of the other same lateral side of the inner and outer arches. Thus, each swash plate ensures opposite motion of a common end of the inner and outer arches. The two shafts for example rotate in the same direction.

Figure 13:
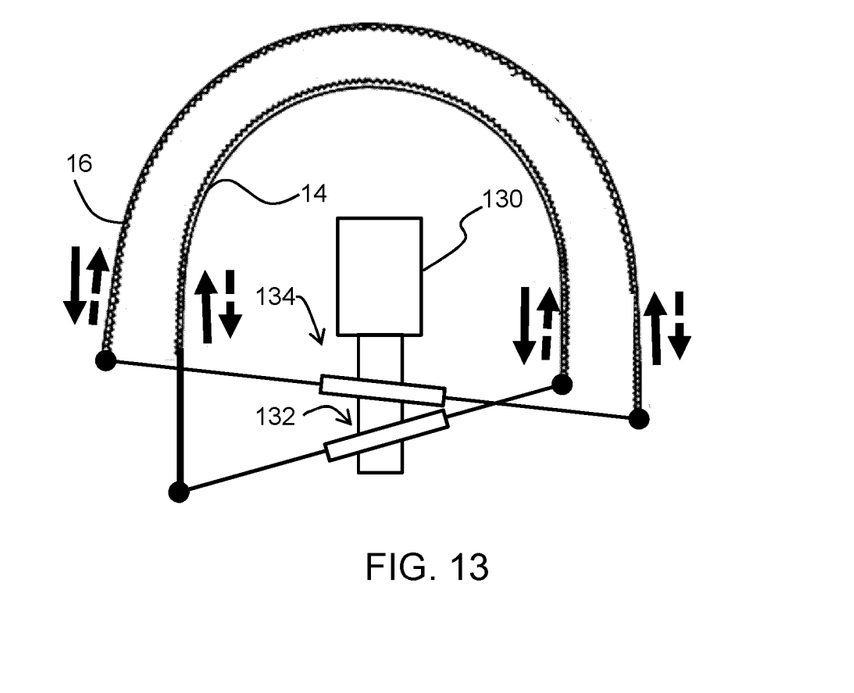
FIG. 13 shows a second alternative actuator design.

FIG. 13 shows a further alternative actuator design.

The actuator comprises a dual shaft motor 130, with two swash plates at the output shafts. A first swash plate 132 driven by one shaft connects to a back of opposite lateral sides of the inner arch 14, and a second swash plate 134 driven by the other shaft connects to a back of opposite lateral sides of the outer arch 16. Thus, each swash plate ensures opposite motion of the two ends of a respective one of the inner and outer arches, and the two swash plates operate in anti-phase with each other. They may for example rotate in opposite directions.

The benefits of anti-phase brushing motion in combination with larger reach can be achieved in this way.

In FIGS. 12 and 13, the swash plates function as the coupling arrangement. The overall swash plate design again connects between adjacent regions (the ends in these examples) of the inner and outer arches, and the adjacent ends are made to move in opposite directions by the overall swash plate design.

The U-shaped channels of the mouthpiece allow occlusal bristles to be added on the stationary base. The incisors bite on the front base part to hold the stationary part stationary. This stationary part may be covered with a (tooth-contacting) cleaning structure (e.g. rough surface or short 0.5-1 mm bristles to have some cleaning of the top incisors). The thickness of this stationary part can be increased to make room for occlusal bristles on the molar-premolar areas.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A mouthpiece for a dental cleaning system, comprising:
    a base;
    an inner arch for positioning adjacent an inner surface of teeth of a jaw of a user;
    an outer arch for positioning adjacent an outer surface of the teeth of the jaw;
    an actuator; and
    a coupling arrangement adapted to couple the base, the inner arch and the outer arch, the coupling arrangement comprising coupling members extending between the inner and outer arches, the coupling members connecting to the base at a location between the inner and outer arches, wherein the coupling arrangement couples to adjacent regions of the inner and outer arches, and converts motion of said region of one of the inner and outer arches in one direction relative to the base to motion in an opposite direction relative to the base of said region of the other of the inner and outer arches.

2. The mouthpiece as claimed in claim 1, wherein the coupling arrangement is configured to provide actuation of the inner arch or the outer arch at a front of the mouthpiece:
    along a single side-to-side axis; or
    within a two dimensional side-to-side and up-down plane.

3. The mouthpiece as claimed in claim 1, wherein the coupling arrangement further comprises:
    a first hinge at a back of a first lateral side of the mouthpiece, which first hinge connects a back portion of the inner arch, a back portion of the outer arch and the base at said first lateral side; and
    a second hinge at a back portion of a second lateral side of the mouthpiece, which second hinge connects a back portion of the inner arch, a back portion of the outer arch and the base at said second lateral side.

4. The mouthpiece as claimed in claim 3, wherein the first and second hinges each comprise:
    a strut, rigidly coupled to the inner and outer arches via with a pivot point located along the strut which is coupled to the base; or
    a first U-bend or W-bend between the outer arch and a connecting node, and a second U-bend or W-bend between the connecting node and the inner arch, wherein the connecting node is coupled to the base.

5. The mouthpiece as claimed in claim 4, wherein the inner arch and outer arch are comprise a first material and the coupling arrangement, or portions of the coupling arrangement, comprise a different material than the first material.

6. The mouthpiece as claimed in claim 1, wherein the coupling arrangement further comprises:

a first hinge along a first lateral side of the mouthpiece set forward from a back of the first lateral side, which first hinge connects the inner arch, the outer arch and the base at that first lateral side; and
    a second hinge along a second lateral side of the mouthpiece set forward from the back of the second lateral side, which second hinge connects the inner arch, the outer arch and the base at that second lateral side.

7. The mouthpiece as claimed in claim 6, wherein the coupling arrangement further comprises a first connector between the inner and outer arches at the back of the first lateral side and a second connector between the inner and outer arches at the back of the second lateral side.

8. A dental cleaning system comprising:
    the mouthpiece as claimed in claim 1; and
    an actuator coupled to the coupling arrangement of the mouthpiece, wherein the actuator applies motion to the inner arch and/or the outer arch, relative to the base.

9. The dental cleaning system as claimed in claim 8, wherein the actuator is arranged in front of the mouthpiece and couples to the outer arch at the front of the mouthpiece.

10. The dental cleaning system as claimed in claim 9, further comprising a frame which carries the actuator, wherein the frame is rigidly coupled to the base,
    wherein the frame couples to the outer arch with a connection which allows rotation of the outer arch relative to the frame about a rotation axis behind the front of the mouthpiece.

11. The dental cleaning system as claimed in claim 8, wherein the actuator comprises a motor with an eccentric coupling element which connects to the outer arch.

12. The dental cleaning system as claimed in claim 8, wherein the actuator is arranged in a space partially surrounded by the inner arch.

13. The dental cleaning system as claimed in claim 12, wherein the coupling arrangement comprises first and second swash plates at the output of the actuator, wherein:
    the first swash plate connects to a back of opposite lateral sides of the inner arch, and the second swash plate connects to a back of opposite lateral sides of the outer arch; or
    the first swash plate connects to a back of one same lateral side of the inner and outer arches, and the second swash plate connects to a back of the other same lateral side of the inner and outer arches.

14. The dental cleaning system as claimed in claim 8, further comprising cleaning elements disposed on the inner arch and the outer arch, and a structural cleaning element mounted on top of the base.

15. A mouthpiece for a dental cleaning system, comprising:
    a base;
    an inner arch for positioning adjacent an inner surface of teeth of a jaw of a user;
    an outer arch for positioning adjacent an outer surface of the teeth of the jaw;
    an actuator; and
    a coupling arrangement adapted to couple the base, the inner arch and the outer arch, wherein the coupling arrangement couples to adjacent regions of the inner and outer arches, and converts motion of said region of one of the inner and outer arches in one direction relative to the base to motion in an opposite direction relative to the base of said region of the other of the inner and outer arches.

16. The mouthpiece as claimed in claim 15, wherein the coupling arrangement is configured to provide actuation of the inner arch or the outer arch at a front of the mouthpiece:
   along a single side-to-side axis; or
   within a two dimensional side-to-side and up-down plane.

17. The mouthpiece as claimed in claim 15, wherein the actuator comprises a motor with an eccentric coupling element which connects to the outer arch.

18. The mouthpiece as claimed in claim 15, wherein the actuator is arranged in a space partially surrounded by the inner arch.

19. A dental cleaning system comprising:
   the mouthpiece as claimed in claim 16; and
   an actuator coupled to the coupling arrangement of the mouthpiece, wherein the actuator applies motion to the inner arch and/or the outer arch, relative to the base.

20. The dental cleaning system as claimed in claim 19, wherein the actuator is arranged in front of the mouthpiece and couples to the outer arch at the front of the mouthpiece.

* * * * *